United States Patent [19]

Held et al.

[11] 3,915,474
[45] Oct. 28, 1975

[54] RECORDING MECHANISM FOR A SAFETY DEVICE USED IN A MOTOR VEHICLE

[75] Inventors: Manfred Held, Kuhbach; Johann Spies, Pfaffenhofen, both of Germany

[73] Assignee: Messerschmitt-Bolkow-Blohm GmbH, Munich, Germany

[22] Filed: Dec. 17, 1973

[21] Appl. No.: 425,494

[30] Foreign Application Priority Data

Dec. 23, 1972 Germany............................ 2263250

[52] U.S. Cl. ................ 280/150 AB; 73/35; 73/391; 73/491; 116/114 AH; 116/DIG. 7; 180/103; 73/489
[51] Int. Cl.² .................................... B60R 21/08
[58] Field of Search ............. 280/150 AB; 180/103; 73/489, 491, 495, 509, 510, 35, 389, 391; 116/70, 114 AH, 123, 124 B, DIG. 7

[56] References Cited

UNITED STATES PATENTS

| | | | |
|---|---|---|---|
| 3,629,816 | 12/1971 | Gillund | 180/103 |
| 3,787,067 | 1/1974 | Bernard | 280/150 AB |
| 3,792,872 | 2/1974 | Jones | 280/150 AB |

*Primary Examiner*—David Schonberg
*Assistant Examiner*—John P. Silverstrim
*Attorney, Agent, or Firm*—Toren, McGeady and Stanger

[57] ABSTRACT

In a safety device activated in a collision for protecting the passengers in a motor vehicle, the movement of a mass, which is displaceable from a rest position under certain conditions of acceleration and deceleration of the vehicle, is arrested by a deformable member or its position is noted by a marking member for recording the position of the mass when an auxiliary force used for activating the safety device is released.

13 Claims, 6 Drawing Figures

RECORDING MECHANISM FOR A SAFETY DEVICE USED IN A MOTOR VEHICLE

SUMMARY OF THE INVENTION

The present invention is directed to a safety device activated in a collision for protecting the passengers in a motor vehicle and, more particularly, it is directed to an arrangement used in the safety device for recording the position of a mass deflected from its rest position under certain conditions of acceleration and deceleration of the vessel, when an auxiliary force, used for activating the safety device, is released.

To reduce the risk of injuries to the passengers in a motor vehicle when the vehicle strikes an obstacle, so-called passive safety devices are used which act as a restraint on the movement of the passengers opposite to the deceleration of the vehicle and prevents them from being thrown out of the vehicle or from striking against hard surfaces in the vehicle. The safety device is released at a certain acceleration or deceleration of the vehicle which occurs during impact. Examples of passive safety devices which have been used are bags inflatable by means of a propellant charge, and safety nets or belts.

In such safety devices it has been known to use a mechanism for recording the acceleration or deceleration of the vehicle, as disclosed in DOS 1,942,176 issued in Germany on Feb. 26, 1970 which includes a sluggish mass held in a cage by spring forces so that the mass closes an electric switch at a certain acceleration for releasing the safety device. The mass is connected to a recorder which marks on a recording medium the size and direction of the acceleration or deceleration. This recorded information can be used after an accident to interpret the forces developed in the vehicle. If the safety device has not been released during the impact of the car, though the deceleration should have released the mechanism, it can be concluded that one of the components of the safety device was defective at the time of the accident. The interpretation of the recorded data on the acceleration or deceleration of the vehicle during impact can decisively influence the question concerning personal and property claims of the passengers against an insurance company.

In the reconstruction of an accident it is also necessary to classify the question of fault as objectively as is possible, since only then can a proper settlement of the claim arising out of the accident be made. Generally, the reconstruction of an accident is possible only by eyewitness, however, in many cases such testimony may not be satisfactory, for example, a situation could develop where the driver of the vehicle claims that he lost control of the vehicle due to the accidental release of the safety device which resulted in the collision.

It is possible, though not very likely, that a safety device could be improperly released by a defect in one of its components. With the known recording device, this question concerning the cause of the collision cannot be answered objectively and an objective answer is important in the settlement of insurance claims.

The primary object of the present invention is to provide an arrangement of the above-described type in which the chronological sequence between the release of the safety device and the impact of the vehicle against an obstacle can be determined exactly.

In accordance with the present invention, it is possible with the use of a marking or restraining mechanism to note the position of the mass in the safety device at the time of the release of the auxiliary force.

With this surprisingly simple solution it is possible to determine the chronological sequence between the release of the safety device and the impact of the car. In addition it is possible, as in known safety devices, to indicate the extent of the acceleration or deceleration of the vehicle at the time of the release of the safety device.

Since safety devices of the type in question are generally actuated by means of an auxiliary force, and preferably a pressure gas, it is of particular importance if the recording mechanism can be actuated by the auxiliary force as it releases the safety device.

One simple construction of the device embodying the present invention involves its installation directly in a gas generator used in inflating a bag which acts as the safety device. In one embodiment of the invention the mass is guided during deflection by guide members and such members are deformable at the time of the release of the auxiliary force for recording the position of the mass by marking the position or by holding the mass in the release position. If it is found, after a vehicle has been involved in a collision and the safety device has been released, that the mass had not yet moved at the time of the release of the safety device, this indicates clearly that there was a defect in one of the components of the safety device which caused its release without the certain deceleration or acceleration condition of the vehicle required for such release. From these circumstances it can be determined that the impact of the vehicle against an obstacle occurred after the release of the safety device. Accordingly, it can be determined that the driver lost control of the vehicle because of the release of the safety device which, in turn, caused the collision.

However, if the mass had been deflected from its rest position by an amount sufficient to release the safety device, it is clear from an observation of the recording mechanism of the present invention that the impact of the vehicle occurred first and that the safety device was then properly released.

In a specific arrangement of the present invention, the guide element or member is a cylinder which laterally braces a cylindrical mass and the mass is displaceable within the cylinger against the force of a helical compression spring. The wall of the cylinder which guides the mass is formed of a deformable material.

This embodiment, which uses deformable materials for the cylinder guiding the mass, is particularly suitable for use when the recording mechanism is installed within a gas generator and, in such a case, the interior of the cylinder guiding the mass must be sealed in a gas-tight manner from the interior of the gas generator. Accordingly, when the pressurized gas is developed it acts on the exterior surfaces of the deformable cylinder wall causing them to deform inwardly. Due to the inward deformation of the cylinder walls, the mass is stopped in its path of movement at the instant when the safety device is released. An exact stoppage of the mass can be obtained if two raised annular rings extending around the mass are in contact with the interior surface of the deformable cylinder.

With this design of the mass, when the exterior of the cylinder is exposed to the pressurized gas at the time of the release of the safety device, the pressure acting on the exterior surface of the cylinder causes it to deform inwardly in the region between the spaced rings on the mass so that its exact position at the time of release is recorded.

In another preferred embodiment of the invention, the mass is mounted on a leaf spring fixed at one end and free at its other so that the free end is guided by a deformable guide member. When this arrangement is used, the mass is stopped in its path of movement when the leaf spring is prevented from further movement by the deformable guide element or the position of the spring is marked by the guide element at the time of release of the safety device. When the leaf spring is secured in position, the guide member acts as a braking plate effective on the free end of the leaf spring. Preferably, the leaf spring has an oblong slot which slides over the guide member so that, when the interior of the guide member is pressurized, it deforms outwardly and holds the leaf spring at its oblong slot.

In this particular arrangement, it is preferable if the guide member is a deformable pressure tube arranged so that the pressurized gas passes through the tube but does not enter into the space containing the leaf spring. In still another embodiment of the present invention, the recording mechanism consists of a mass located within a cylindrical housing and moving against the biasing action of a spring. In a pressure tube extending perpendicularly to the cylindrical housing and intersecting the path of movement of the mass, a piston is secured in place and has a pointed marking member at its end facing the mass. The piston is held in position within the tube under normal conditions, however, when the pressurized gas which inflates the safety device is released, it also acts on the piston and propels it into the path of movement of the mass so that the pointed member in its end marks the position on the mass at which the pressurized gas was generated. It is also possible to use a mechanical force for actuating the marking mechanism where it is tapped on the check valve of a belt tightener.

Furthermore, it is possible to incorporate a switch into the mechanism of the present invention which responds to certain decelerations or accelerations of the vehicle for releasing the safety device. The switch can be actuated in a simple manner by utilizing the mass as it is displaced from its rest position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3b is a detail feature of the arrangement shown in FIG. 3a; and

DETAILED DESCRIPTION OF THE INVENTION

Figure 1:
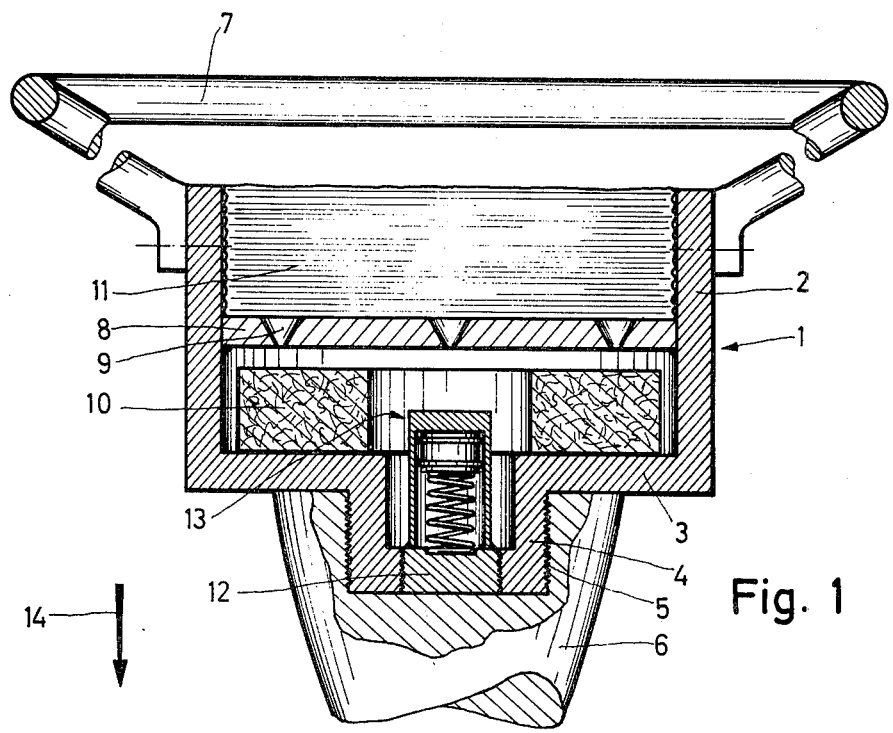
FIG. 1 is a cross sectional view of a safety device for use in a car which embodies one embodiment of the present invention.

In FIG. 1 a safety device 1 is illustrated for use in a motor vehicle, not shown, for protecting the driver and other passengers from injury in a collision where the vehicle strikes against an obstacle or another car. The safety device 1 consists of a pot-shaped housing 2 with its bottom 3 containing a centrally arranged socket 4 extending outwardly from the bottom 3 and having a male thread formed on its outer surface. By means of the male thread 5, the housing 2 is threaded into the steering column 6 of a motor vehicle so that the open end of the housing, that is the opposite end from the bottom 3, faces the passengers in the vehicle. As is shown only in FIG. 1, a steering wheel 7 is associated with and extends about the open end of the housing 2.

The housing 2 of the safety device 1 is divided by a partition 8 which extends transversely of the axis of the housing and the steering column, into an upper region and a lower region with the lower region located closer to the steering column 6. Several nozzles 9 extend through the partition 8 and afford communication between the lower region and the upper region. Within the lower region and seated on the bottom 3 of the housing is an annular propellant charge 10. In the upper region, above the partition 8, an inflatable bag 11 is arranged in the folded position within the open end of the housing 2. As soon as the deceleration of the motor vehicle exceeds a certain value, the propellant charge 10 is ignited by a mechanism, not shown, and burns out in a very short time. As the propellant charge 10 burns it produces a pressurized gas which escapes through the nozzles 9 into the upper region of the housing and inflates the bag 11 so that the bag projects outwardly from the steering wheel or other positions in the vehicle to hold the passengers against the effects of the impact of the vehicle in a collision.

A bottom plate 12 is threaded into the base of the socket 4 and forms a base for a mechanism 13 which extends upwardly into the lower region of the housing 2 inwardly from the propellant charge 10. The mechanism 13 consists of a cylinder 15 mounted in a gas-tight manner on the plate 12 so that the interior of the cylinder is sealed from any gas located within the lower region of the housing. Further, the axis of the cylinder extends in the direction of travel of the vehicle. Within the cylinder, a mass 17, hereinafter referred to as a piston, is biased by a helical spring 16 against the upper limiting wall of the cylinder and the spring is dimensioned so that its biasing force on the piston 17 prevents the piston from movement from its rest position shown in FIGS. 1 and 2a under normal vehicle operating conditions. Two ring-shaped ridges 18 extend around the circumferential periphery of the piston and the ridges slide on the inside surface of the cylinder wall 19. In addition, the piston has a central bore extending in the axial direction of the cylinder so that it is exposed during movement to the spring force but not to any additional suction force. In operation the mechanism 13 functions as follows: As soon as the propellant charge 10 is ignited, the reason for such ignition is not important here, a pressurized gas is generated which flows from the lower region in the housing through the nozzle 9 in the plate 8 and inflates bag 11. In addition, the pressurized gas within the lower region contacts and acts on the exterior surface of the mechanism 13. Due to the gas acting uniformly on the outer surface of cylinder wall 19 and since the interior of the cylinder is sealed so that the pressurized gas does not enter within the cylinder, the wall 19 is deformed inwardly and constricts the movement of the piston 17, as shown in FIG. 2b, at the points within the cylinder where the piston 17 is located at the time of the ignition of the propellant charge 10. As can be seen in FIG. 2b, the piston 17 has moved in the axial direction of the cylinder a certain distance at the time the cylinder wall 19 is deformed inwardly and restricts or holds the piston in position. Based on the extent of the distance travelled by the piston, it is possible to determine the acceleration acting on the vehicle at the time of the ignition of the propellant charge 10. If the acceleration was of an extent that a release of the safety device was justified, it can be noted, after the impact of the car against an obstacle in a collision, that the safety device was released only after the vehicle had struck the obstacle.

Figure 2A:
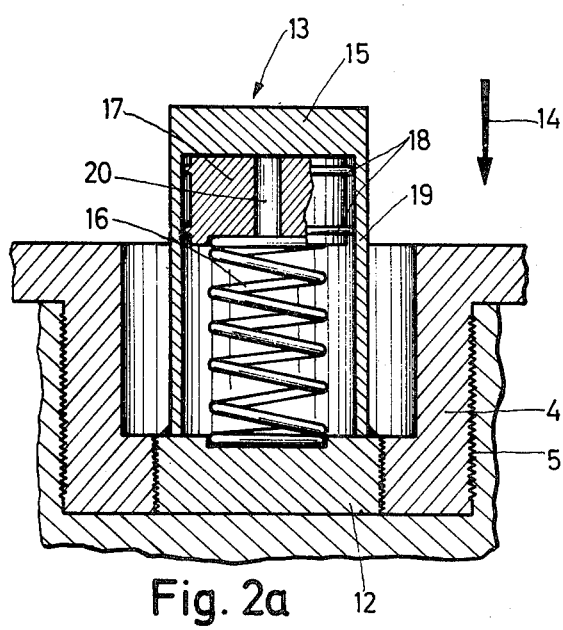
FIG. 2a is an enlarged detail view of a portion of FIG. 1.
Figure 2B:
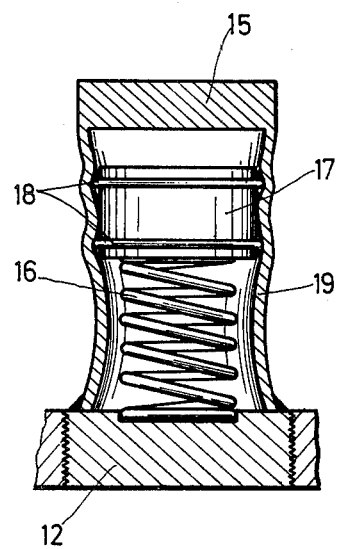
FIG. 2b is a detail of the arrangement shown in FIG. 2a after the safety device has been actuated.

However, if the distance traversed by the piston is too small to have triggered a release of the safety device or if the piston has remained in its rest position as shown in FIGS. 1 and 2a, it can be established that the safety device 1 was released without the occurrence of an impact of the vehicle against an obstacle, rather the driver had lost control of the vehicle due to the improper release of the safety device and subsequently had struck an obstacle.

Figure 3A:
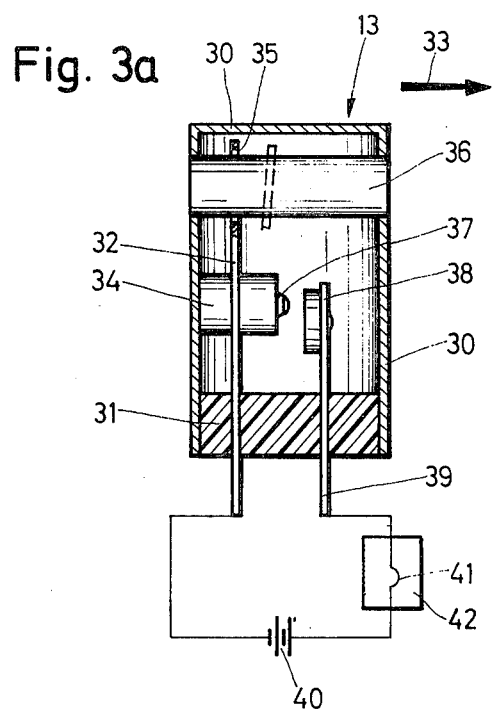
FIG. 3a is a detail view of another embodiment of the present invention.
Figure 3B:
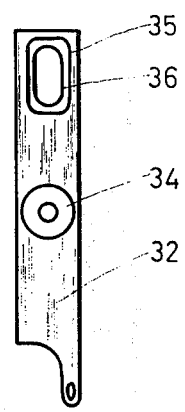

In FIG. 3a, another embodiment of the mechanism 13 is shown and consists of a housing 30 closed at one end and with its other end sealed by a bottom plate 31. A leaf spring 32 protrudes through the bottom plate 31 into the interior of the housing with its free end located adjacent the closed end of the housing 30. Within the housing and intermediate the ends of the leaf spring, a mass is mounted on the spring and is exposed to the deceleration forces of the car in the travelling direction. The end of the leaf spring 32 extending upwardly above the mass has an oblong slot or opening 35 adjacent its free end. An open-ended gas-tight tube 36 is mounted in and extends through the housing passing through the oblong slot 35 in the spring 32. The open ends of the tube 36 are open to the space located about the housing 30 and the interior of the tube is sealed from the interior of the housing. When the mechanism 13 of FIG. 3a is installed in a gas-generating space as shown in FIG. 1, the interior of the tube is exposed to the pressure of the gas generator and its exterior is exposed to the space within the housing 30 which is sealed from the gas-generating space. If the mechanism 13 in FIG. 3a is not located in a gas-generating space, then a socket could be attached to the tube for introducing pressurized gas into its interior.

The wall thickness of the tube 36 is selected so that it is deformable under the force of the pressurized gas to expand outwardly for recording the position or for securing the free end of the leaf spring in the position in which it is located when the pressurized gas is generated. In FIG. 3a, the deflected position of the free end of the leaf spring is shown in dashed lines relative to the exterior surface of the tube 36.

In operation, in the same manner as described for the first embodiment, the tube 36 is deformed when the propellant charge is ignited and releases a pressurized gas and the expansion of the tube clamps or holds the leaf spring 32 in its oblong slot 35.

In this arrangement it is also possible to determine the exact chronological sequence which occurred between the release of the safety device and the impact of the vehicle against an obstacle.

In addition, the arrangement shown in FIG. 3a is also provided with a release for the safety device. The bottom plate 31 is formed of insulating material and the leaf spring 32 and the mass or piston 34 are formed of a conductive material. The end of the piston 34 facing in the direction of the arrow 33 has a contact nipple 37 which can be deflected against a counter-contact 38 which has a lead 39 extending out of the housing 30 through the bottom plate 31. The leaf spring 32 and the lead 39 are connected to one another by a circuit including a battery and also an ignition element 41 for a propellant charge 42 of the gas generator which is represented only schematically in the drawing.

As soon as the vehicle is decelerated as the result of a collision, the mass 34 moves against the biasing force of the leaf spring 32 in the direction of the arrow 33, which represents the travelling direction of the vehicle, until its contact nipple 37 engages the counter-contact 38 and closes the circuit including the battery 40, the ignition element 41, the leaf spring 32 and the piston or mass 34. With the circuit closed, the propellant charge is ignited and the gas is generated, the broken line in FIG. 3a represents the position of the leaf spring when ignition takes place. The pressurized gas generated flows into the tube 36, deforms it outwardly so that it engages the leaf spring and stops its movement. Naturally, it is also possible to combine the switch described above with a separate impact sensor or to us an electrical recording device for the control.

In the embodiment described above, it is assumed that the mechanism 13 is installed directly within the space containing the gas generator. It is also possible, of course, to ensure the deformation of the cylinder 15 in the first embodiment or of the guide tube 36 in the second embodiment, if the mechanism 13 is not installed in the gas-generating space but is connected to it over a conduit.

Figure 4:
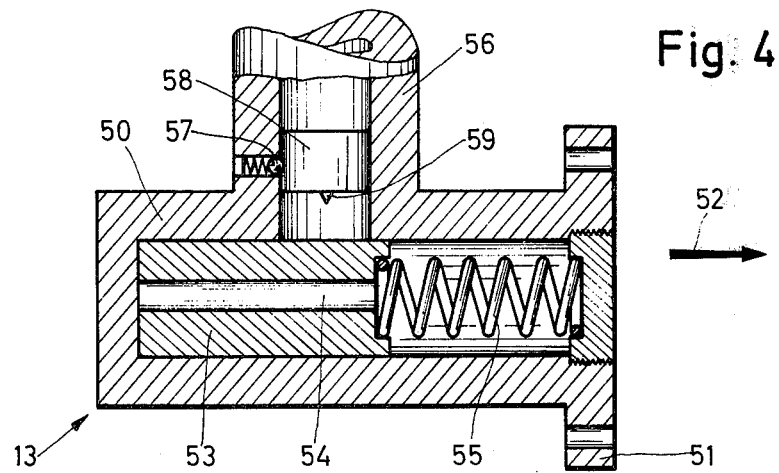
FIG. 4 is a detail view of a third embodiment of the present invention.

In FIG. 4, another embodiment is shown in which the mechanism 13 is not located within the gas-generating space but is connected to it over a pressure tube. The mechanism 13, as shown in FIG. 4, again consists of a housing 50 which is mounted in the vehicle by means of a flange 51 so that the axial direction of the housing extends generally in the direction of travel of the vehicle as is indicated by the arrow 52. Within the housing 50 and similar to the first embodiment, a piston 53 provided with an axially extending central bore 54 is held in contact with the inner surface of the housing 50 by means of a helical compression spring 55. A pressure tube 56 is connected to the side wall of the housing 50 so that the axis of the pressure tube intersects the axis of the housing and is located at a position in the path of movement of the piston 53 within the housing. The pressure tube 56 is connected directly to the gas generator. Within the pressure tube and extending transversely across its bore is a marking cylinder 58 which is held in position by a spring biased ball member 57. The cylinder 58 is held in spaced relationship from the piston 53 and its face or end directed toward the piston contains a spike or pointed member 59. The cylinder 58 effects a seal across pressure tube 56.

As soon as the safety device is actuated by the release or ignition of the gas generator, the pressurized gas generated contacts the end of the marking cylinder 58 on the opposite side from the pointed member 59 and the pressure of the gas is sufficient to displace the cylinder 58 from engagement with the ball member 57 and to displace it toward the piston 53 within the housing 50. The pointed member 59 on the marking cylinder 58 records or marks the time on the piston at which the safety device was released. It is also possible that the pointed member 59 and the cylinder 58 effect the stoppage of the piston 53. As with the other embodiments, it is possible to determine from the marking or stopping of the piston 53 by the pointed member 59, the acceleration acting on the vehicle at the time of the release of the safety device and the chronological sequence between the release of the safety device and the impact of the vehicle against an obstacle.

In this embodiment it is also possible to determine the maximum value of the deceleration of the car, since the marking cylinder 58 can be held by the ball member 57 in a position in which the pointed member 59 scratches the surface of the piston 53 during its movement. The length of the scratch or mark made on the surface of the piston 53 by the pointed member 59 is a measure of the maximum deceleration of the vehicle during an impact.

Though the mechanism for recording the acceleration or deceleration of a vehicle has been described in the foregoing embodiments only in connection with a gas generator system, it is also possible to connect the mechanism to other systems, for example, to the check valve of a belt tightener.

It is possible to use a switch in any of the above-described embodiments, as illustrated in the second embodiment, which serves as an impact sensor and by which the safety device is actuated, or which can be used for other purposes, for example, for controlling electric recording devices.

While specific embodiments of the invention have been shown and described in detail to illustrate the application of the inventive principles, it will be understood that the invention may be embodied otherwise without departing from such principles.

We claim:

1. In a motor vehicle safety device actuated in a collision, by means of an actuating force such as deceleration and acceleration, to release gas under pressure for supplying a pressurized gas force to operate said safety device for protecting occupants of said vehicle, the improvement comprising a mass displaceable from a rest position in response to said actuating force, and means for supporting and guiding said mass, said supporting and guiding means comprising a member having a portion thereof movable, in response to said pressurized gas force, into engagement with said mass whereby the position of said mass, at the time of the release of said pressurized gas, is recorded.

2. In a motor vehicle safety device as claimed in claim 1, said portion being deformable in response to said pressurized gas for contacting and holding said mass in position at the time of actuation of said safety device to thereby record the position of said mass.

3. In a motor vehicle safety device as claimed in claim 1, said mass comprising a cylindrically-shaped piston, said member comprising a cylinder and coaxial with said piston so that it laterally encloses said piston, the improvement further comprising a spring positioned within said cylinder and biasing said piston against the movement in the direction of movement of the motor vehicle, and said portion comprising the cylindrically-shaped surface of said cylinder, said surface being deformable for displacement inwardly into contact and holding engagement with said piston to thereby record the positions of said mass.

4. In a motor vehicle safety device as claimed in claim 3, said piston having a pair of axially spaced ring-like ridges formed on its cylindrically-shaped surface and said ridges are disposed in sliding contact with said surface of said cylinder.

5. In a motor vehicle safety device as claimed in claim 3, the improvement further comprising a switch connected to said mass for initiating said pressurized gas force in response to a predetermined axial movement by said mass.

6. In a motor vehicle safety device as claimed in claim 3, said means for supporting and guiding further comprising a housing enclosing said member and forming a space about said member, a propellant charge positioned in the space about said member and arranged upon ignition to provide said pressurized gas force which contacts the exterior surface of said member and deforms it inwardly.

7. In a motor vehicle safety device as claimed in claim 1, said member comprising a housing enclosing said mass, said mass including a body and an elongated leaf spring secured at one end to said housing and extending from its secured end into said housing with its other end free to deflect within said housing, said body located within said housing and supported on said leaf spring intermediate the free end and the secured end thereof, said portion extending through said housing adjacent the free end of said spring and said spring guided by and arranged to move along said portion, said portion being deformable by said gas force for moving into contact and holding engagement with said leaf spring.

8. In a motor vehicle safety device as claimed in claim 7, said leaf spring having a slot therethrough adjacent its free end and said portion extending through said slot so that said leaf spring can move over said portion until said portion is deformed into holding engagement with said spring.

9. In a motor vehicle safety device as claimed in claim 8, said portion comprising a tubular member open at its ends, said means for supporting and guiding comprising a second housing enclosing said housing containing said portion and the ends of said tubular member being open to the space within said second housing and the housing containing said leaf spring being sealed from the space within said second housing so that the pressurized gas can flow through said tubular member for deforming it outwardly into contact with said leaf spring.

10. In a motor vehicle safety device as claimed in claim 1, said mass comprising a first piston, said member comprising a housing enclosing said first piston and laterally guiding the side surfaces of said piston when it moves through the space formed by said housing, spring means located within said housing and acting on said first piston for maintaining it in a rest position until said certain forces act on said piston, a pressure tube connected to said housing and opening into the space within said housing and the axis of said pressure tube extending transversely of and intersecting the path of movement of said first piston within said housing, said portion comprising a second piston positioned within and axially displaceable through said pressure tube, means for holding said second piston in spaced relationship from the intersection of said housing and said pressure tube, a pointed member mounted in the end of said second piston which faces toward the space within said housing, said pressure tube disposed in communication with the pressurized gas force so that in response to the pressurized gas force, said second piston is displaceable into contact with said first piston and said pointed member in the end of said piston marks said first piston for recording the position of said first piston at the time of the activation of the safety device.

11. In a motor vehicle safety device as claimed in claim 10, said means for holding said second piston in spaced relationship from said first piston comprising a spring-biased ball mounted in said pressure tube and seated in holding engagement with said second piston and holding action of said spring-biased ball being insufficient to hold said second piston against the action of the pressurized gas force.

12. In a motor vehicle safety device as claimed in claim 10, the improvement further comprising a switch connected to said mass for initiating said pressurized gas force in response to a predetermined axial movement by said mass.

13. In a motor vehicle safety device as claimed in claim 7, the improvement further comprising a switch connected to said mass for initiating said pressurized gas force in response to a predetermined axial movement by said mass.

* * * * *